1

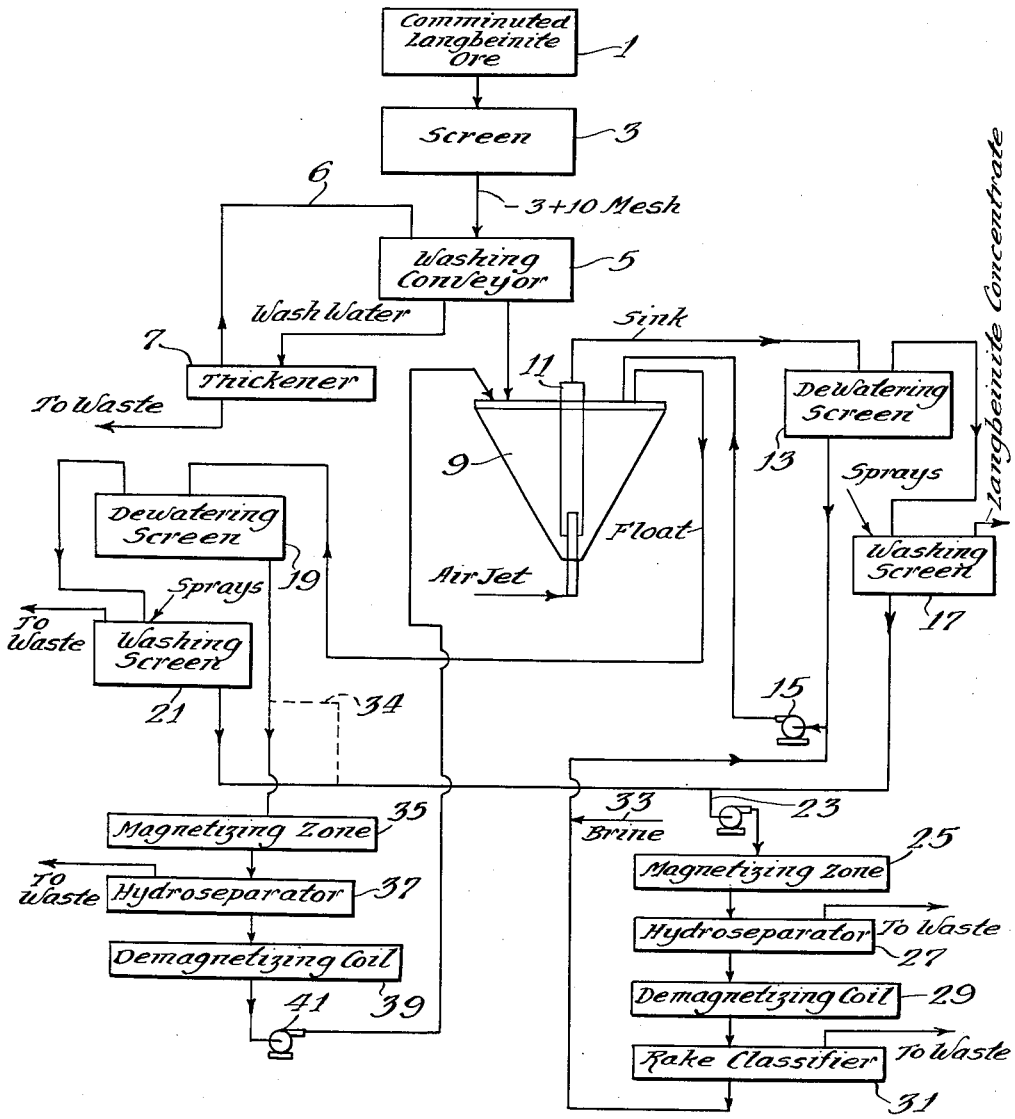

3,063,562
BENEFICIATION OF POTASH ORE
Albert Adams and Sam E. Tschappler, Carlsbad, N. Mex., assignors to International Minerals & Chemical Corporation, a corporation of New York
Filed Nov. 3, 1960, Ser. No. 67,117
20 Claims. (Cl. 209—10)

The present invention generally relates to the beneficiation of potash ores. It more particularly relates to the heavy media beneficiation of langbeinite ores.

As is well known, potash is of great economic importance. Potassium is an essential plant nutrient and large amounts of potash are, therefore, used in fertilizers. On the North American continent, one frequently encountered potash salt is sylvite (KCl). The sylvite is not usually found as the pure salt but as sylvinite ore which is a mixture of sylvite and halite (NaCl). The sylvite values in potash ores, such as sylvinite ore, may readily be recovered or concentrated by various concentration processes, such as crystallization, froth flotation, etc.

Langbeinite, $K_2SO_4 \cdot 2MgSO_4$, is also found in potash ores, such as the potash ores of the Permian Basin of the southwest area of the United States which are mined chiefly in the Carlsbad district of New Mexico. Langbeinite is a useful fertilizer ingredient since it not only contains potassium but also magnesium and sulfur which are essential plant nutrients especially desirable for fertilizing alfalfa, soybeans, cotton, etc. Langbeinite ores are, however, generally difficult to upgrade using conventional processes.

It is an object of the present invention to provide a novel process for beneficiating potash ores.

It is a further object of the invention to provide a heavy media separation process for beneficiating potash ores.

It is another object of the invention to provide a heavy media separation process for beneficiating langbeinite ores.

These and other objects and advantages of the present invention will be apparent from the description of the invention.

In general, the present invention comprises introducing a potash ore of a size range suitable for sink and float separation into a substantially self-sustaining separating medium comprising a brine substantially saturated with respect to said potash ore, whereby the light particles float and the heavy particles sink, and recovering separately the sink product and the float product.

There is considerable interest in the so-called "heavy media" or "sink-float" separation process. The process has achieved a wide use in ore dressing. In its simplest form, a mixture of two kinds of solid particles of different specific gravities is immersed in a fluid having a density greater than one solid and less than the other. The mixture is thereby separated into its component parts by the tendency of the heavy materials to sink and the lighter materials to float.

In the usual heavy media separation process, the ore is fed to a separatory vessel containing a suspension of finely ground weighting agent, usually ferrosilicon and/or magnetite, in water, with the whole suspension maintained at a specific gravity between that of the desirable and the unwanted fractions of the feed. The heavier mineral components sink and the lighter mineral components float. The medium adhering to the sink and float products is washed off and recovered for reuse.

The suspension of finely divided ferrosilicon and/or magnetite, or other weighting agent, is prepared by pulping the weighting agent with water, thereby obtaining a fluid medium which very closely approaches heavy liquids in stability and viscosity. It is not necessary to use vigorous mechanical agitation or strong rising currents of water to keep the solids in suspension since the suspension is substantially self sustaining with the moderate agitation produced by recycling medium in the normal operation. In a good operation, the specific gravity of the medium can be maintained within 0.01 of the predetermined specific gravity at which it is desired to operate.

So far the prior art heavy media processes have been substantially restricted to beneficiating water insoluble ores. It has now been discovered, and the present invention is partly based on the discovery, that potash ores that are substantially water soluble may be beneficiated in a heavy media process utilizing a separating medium comprising a brine substantially saturated with respect to the potash ore. While the saturated brine generally has a higher viscosity than water, it has been determined that the viscosity is still low enough so that good separation by the sink-float process can be effected. Specifically, sylvite may effectively be separated from kainite, sylvite from halite, sylvite from leonite, sylvite from polyhalite, sylvite from langbeinite, halite from polyhalite, halite from langbeinite, leonite from polyhalite, and leonite from langbeinite. As hereinbefore set forth, the beneficiation of langbeinite ores is particularly difficult when using a conventional beneficiation method such as flotation or crystallization. The process of the present invention is particularly effective for beneficiating langbeinite ores containing at least 10% by weight of langbeinite. The process of the present invention effectively separates langbeinite from sylvite and/or halite. The further presentation of the present invention will be primarily directed to the beneficiation of langbeinite ores, however, it is to be understood that the process may effectively beneficiate other potash ores.

In the process of the present invention, the mine run potash ore is comminuted to produce particles in a size range suitable for sink and float separation. In general, the upper size limit is dependent on the crushing characteristics of the ore as regards the liberation of the langbeinite or one of the major gangue constituents. In substantially all langbeinite ores, langbeinite is associated with halite and the purpose of any beneficiation is, of course, to separate the langbeinite from the halite. Halite is substantially liberated, even in the larger size ranges, for example 2″. On the other hand, very little pure langbeinite is found in the size ranges amenable to heavy media beneficiation. The langbeinite is usually bound with halite and, therefore, is usually present in a middling or locked particle. The liberated halite may, however, be readily separated from the langbeinite-containing particles since substantial amounts of the langbeinite-containing particles fall within the specific gravity range of from about 2.50 to 2.79, while the liberated halite particles have a substantially lower specific gravity of about 1.98. For example, in a −4 +6 mesh fraction of a langbeinite ore analyzing 20.1% langbeinite and 67.7% halite, about 90% of all the langbeinite in the fraction was in particles having a specific gravity within the range of from about 2.50 to about 2.79, and 10% of the langbeinite in the fraction was in particles in the gravity range of from about 2.23 to about 2.50. The potash ore is preferably comminuted to −2″, more preferably to −1″ and more preferably to −3 mesh size. While heavy media separation of material finer than −65 mesh can be accomplished, it is most efficient on material from which the minus 65 mesh fines have been substantially removed. Heavy media separation of +10 mesh particles is particularly effective; therefore, feed is preferably at least 90% +10 mesh and more preferably at least 92% +10 mesh. The general size range for beneficiation in the heavy media circuit is, therefore, −2″ +65 mesh, preferably −1″ +65 mesh, more preferably −1″ +10 mesh and still more preferably −3 +10 mesh. Results have indicated the technical soundness of heavy media separation as a commercial method for separating a −3 +10 mesh fraction of langbeinite ore. Particles in these size ranges are suitable for sink and float separation.

The ore fraction after sizing, however, usually still contains primary clay slimes and fines which are not amenable to sink and float separation. Slimes are objectionable because they dilute the separating medium and increase its viscosity. Slimes are, therefore, preferably removed prior to the heavy media separation. The harmful effect of slimes can also be reduced to a great extent by the use of efficient methods for cleaning the medium. The development of ferrous weighting agent or media and magnetic recovery means has eliminated the need for complete slime removal before treatment because of the efficiency of magnetic recovery or concentration. Part of the slimes are, however, preferably removed prior to the sink-float separation.

It has been determined that a beneficial removal of a substantial portion of the clay slimes may be effected by a quick wash with a brine substantially saturated with respect to the langbeinite ore. In a pilot plant operation, this type of wash removed about one-fourth of the liberated clay slimes. The quick wash may effectively be conducted by the use of a washing screen with a spray of the brine being directed onto the ore fraction on the screen. Other suitable quick wash methods may, however, be used to effect a substantial removal of the liberated slimes.

The comminuted langebeinite ore is then introduced into a separatory vessel and is then split into a sink product and a float product. The ore is preferably in the vessel for at least 5 seconds and preferably less than 5 minutes. Substantially all of the separation in a langebeinite beneficiation takes place in about 30 seconds.

The heavy media in the separatory vessel is a suspension of a weighting agent, preferably ferrous media, in a brine substantially saturated with respect to the potash or feed. Ferrous media, such as magnetite and/or ferrosilicon, is preferred because of the low cost, ease of recovery and cleaning by magnetic means, and the ability to form a fluid medium in the brine of the predetermined specific gravity. The magnetite and/or the ferrosilicon for use in heavy media plants are readily available in commercial quantities. The ferrous media is substantially all −65 mesh particles. These are very readily suspended in the brine and the resultant suspension is substantially self-sustaining with the moderate agitation produced by recycling medium in the normal operation.

The suspension of the ferrous media in the brine generally has a higher viscosity than would be the case with the same amount of ferrous media in water. However, it has been determined that the viscosity is still low enough that an efficient commercial separation of potash ores, particularly separation of the materials hereinbefore mentioned, can be effected. The ferrous media is added to the saturated brine to obtain a specific gravity falling between the specific gravities of the components of the feed that it is desired to separate. For separating langebeinite from halite, the sharpest separation occurs at a specific gravity of about 2.35. A preferred range of the heavy media specific gravity is from about 2.05 to about 2.50. When operating near the lower end of this range more halite appears in the sink and conversely when operating near the upper end of this range, more langebeinite is lost in the float. When operating within the preferred range, a pilot plant operation consistently recovered over 80% of the langbeinite values in a langbeinite ore fraction feed, with an average recovery over an eight day operation of 89.9%.

The separatory vessel may be of any suitable type. The vessels used in conventional heavy media separation plants are generally satisfactory. The cone is a preferred type of separatory vessel, however, classifier and drum-type separatory vessels may be used. The feed is, in general, introduced into the separatory vessel opposite to the float overflow or float removal section.

In the separatory vessel the light fraction floats and may be removed by any suitable means, such as by overflowing a weir. The heavy particles, or langbeinite concentrate, sink and are removed by any suitable means. The heavy particles are usually removed continously by an airlift.

The separately removed sink and float fractions are then separately further treated to remove the ferrous media from the solids and to recover the heavy media. This further treatment is presented in the following description wherein reference is made to the accompanying drawing which is a diagrammatic flow sheet representing a preferred embodiment of the invention.

Referring now to the drawing, a comminuted mine run langbeinite ore 1, is sized on a sizing screen 3 to produce a −3 +10 mesh fraction which is passed to a washing conveyor 5. On the washing conveyor 5, the ore fraction is given a quick wash with sprays of saturated brine introduced to the washing conveyor via line 6. The wash removes some of the slimes from the ore. The wash water is introduced into a thickener 7 which settles the slimes. The clarified saturated brine from the thickener 7 is recirculated via line 6 to the washing conveyor 5 and the underflow is sent to waste. The washed langbeinite ore fraction is introduced into a separatory cone 9 which contains a pulp of magnetite in a brine substantially saturated with respect to the langbeinite ore feed. The heavy media in the separatory cone 9 is maintained at a specific gravity of about 2.35. The sink product which contains substantially all of the langbeinite particles is removed continuously by an airlift 11. The light fraction which contains substantially all of the liberated halite floats and is continuously overflowed from the separatory cone 9.

The sink product is introduced to a dewatering or drainage screen 13. On the drainage screen a major portion, usually at least 90%, of the medium which is elevated in the airlift drains through the screen and is recirculated to the separatory cone 9 by a pump 15.

From the drainage screen 13 the sink product, which is still contaminated with ferrous medium, clay, and fine ore particles passes to a washing screen 17 wherein substantially complete removal of adhering medium and fines is accomplished by sprays of an aqueous medium which is substantially unsaturated with respect to the ore components. This is a novel feature of the present process. In conventional heavy media separation processes, the sink fraction is washed, but no substantial dissolving of any of the material in the sink is effected. In the conventional process, therefore, the fines, as well as the insoluble clay slimes, which are washed off of the sink product must be subsequently separated from the ferrous medium before the ferrous medium is reused. In the process of this invention an aqueous medium which is substantially unsaturated with respect to the water soluble components is used. Therefore, when such an aqueous medium is used to spray onto the sink product, the ferrous medium is washed off and the water soluble fines go into solution. The aqueous wash medium is used in sufficient quantity to dissolve substantially all of the water soluble fines which would usually pass through the screen so that substantially no undissolved water soluble ore component fines are present in the wash liquor. In this manner the wash screen 17 underflow is substantially free of water soluble fines and the insoluble clay slimes are effectively the only contaminates that need be removed from the ferrous medium before the ferrous medium is reused. The langbeinite concentrate removed from the washing screen may be dried and recovered as product or further treated as desired. The wash medium passing through the washing screen 17 is then treated for the recovery of the ferrous medium as is hereinafter described.

The float from the separatory cone 9 is also passed to a dewatering or drainage screen 19. On the drainage screen 19 a major portion, usually more than 90%, of the ferrous medium which overflows with the float drains through the screen. The material which drains through the screen is treated as is hereinafter described. The float contains a major portion of the liberated halite in the ore feed.

The float from the dewatering screen, which is still contaminated with ferrous medium, clay slimes, and fine ore particles, is then passed to a washing screen 21 wherein substantially complete removal of adhering medium is effected by sprays of an aqueous medium which is substantially unsaturated with respect to the ore components. The aqueous wash medium is used in sufficient quantity to dissolve the water soluble fines which would usually pass through the screen so that substantially no undissolved water soluble ore component fines are present in the wash liquor passing through the wash screen. In this manner the wash screen 21 underflow is substantially free of water soluble fines.

The float on the washing screen 21 in a langbeinite beneficiation is primarily impure halite and is usually sent to waste, however, it may be recovered as a product or further treated as desired.

The underflow or wash medium from the washing screen 21 for the float is preferably combined with the underflow from the washing screen 17 for the sink, and the combined stream 23 is treated to recover the ferrous medium. The combined stream 23 is too dilute and contaminated with slimes to be returned directly as medium to the separatory cone 9. The combined stream is, however, free of water soluble ore constituents which greatly facilitates the treatment to recover the ferrous medium since the clay slimes may be very effectively removed from the ferrous medium by the economical and efficient method of hydroseparation.

The combined stream 23 is pumped through a magnetizing zone 25 to a hydroseparator 27. In the magnetizing zone 25 the particles of magnetite and/or ferrosilicon are magnetized, causing their mutual attraction and flocculation, so that settling in the thickener or hydroseparator 27 is faster, and a smaller thickener may be used. The clay slimes overflow the hydroseparator and are sent to waste. The thickened solids removed as underflow from the hydroseparator then passed through a demagnetizing coil 29. The demagneizting coil destroys the magnetic charge on the particles and thereby allows them to disperse uniformly through the liquid. The stream from the demagnetizing coil may be pumped with the screen throughs from dewatering screen 13 back to the separatory cone 9. It is, however, important to maintain the heavy media returned to the separatory cone at the predetermined specific gravity. It is, therefore preferable to thicken the demagnetized heavy media in a rake classifier 31, sending the overflow to waste and pumping the underflow back to the separatory cone 9. When necessary, a saturated brine 33 may be added to the rake classifier underflow before returning it to the cone 9.

The underflow from the dewatering screen 19 for the float generally contains too much clay slimes to be recycled directly to the separatory cone. The underflow is, therefore, preferably treated to remove the slims. All of the underflow, or at least a portion thereof, may be combined with the underflow from the washing screens 17 and 21 and cleaned in that circuit, as shown by the dotted line 34 in the drawing. The underflow is, however, preferably cleaned in its own circuit, and as shown in the drawing it is, accordingly, pumped through a magnetizing zone 35 into a hydroseparator 37. In the magnetizing zone the particles of magnetite and/or ferrosilicon are magnetized, causing their mutual attraction and flocculation so that settling in the thickener or hydroseparator 37 is faster, and a smaller thickener may be used. The clay slimes overflow the hydroseparator 37 and are sent to waste. The thickened solids removed as underflow from the hydroseparator 37 are then passed through a damagnetizing coil 39. The demagnetizing coil 39 destroys the magnetic charge on the particles and thereby allows them to disperse uniformly through the liquid. The demagnetized medium is then pumped by pump 41 back to the separatory cone 9.

In order to give a fuller understanding of the invention, but with no intention to be limited thereto, the following specific example is given.

*Example*

A mine run langbeinite ore was comminuted and a −3 +10 mesh fraction screened therefrom. The fraction had a size analysis of 95.7% +10 mesh and 4.3% −10 mesh. The fraction contained 26% langebeinite, 73% halite, and about 1.0% clay slimes.

The fraction was treated for the recovery of langbeinite in a continuous process as described and illustrated in the flow sheet.

The fraction was given a quick wash with saturated brine just prior to introduction to the separatory vessel. The wash removed about one-fourth of the liberated clay slimes.

The washed feed was introduced into a separatory cone at the rate of 10 lbs./minute. The heavy media in the separatory vessel had a specific gravity of about 2.23. The heavy media was magnetite suspended in a brine saturated with respect to the langbeinite ore feed. An agitator in the separatory cone operated at 12 r.p.m. The float had a specific gravity of 2.078. The sink had a specific gravity of 2.279. The separation took place in about 30 seconds.

The overflow from the separatory cone was passed over an air vibrated 20 mesh screen where media was separated from the reject float. The media was recycled back to the separatory cone. The reject solids were then passed to a shaking screen where they were spray washed with water for removal of adhering media. The washed solids were then sent to waste. These solids had an analysis of 5% by weight of langbeinite.

The sink product in the separatory vessel was removed by an air lift, passed over a vibrating screen for media removal, and then onto a shaking screen for a water wash. The washed solids analyzed 48% langbeinite and represented a 92.0% by weight recovery of langbeinite. In the process 66% of the halite was rejected.

The underflow from both the float and sink washing screens and a portion of the float dewatering screen underflow were combined and passed through a magnetizing coil into a hydroseparator. In the hydroseparator clay slimes were overflowed. The underflow from the hydroseparator was passed through a demagnetizing coil to a classifier. The overflow from the classifier was sent to waste and the underflow was pumped back to the separatory cone.

The example illustrates that a high recovery of a langbeinite concentrate may be effected in a heavy media process as set forth in the specification.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A process for beneficiating a potash ore containing langbeinite and halide which comprises introducing said potash ore of a size range suitable for sink and float separation into a substantially self-sustaining separating medium comprising a ferrous medium suspended in a brine substantially saturated with respect to said potash ore, said separating medium having a specific gravity intermediate the specific gravities of the langbeinite and halite in said potash ore, whereby the particles of a specific gravity lower than said separating medium float and the particles of a specific gravity higher than said separating medium sink, removing separately the sink product and the float product, washing at least one of said separately removed products with a brine unsaturated with respect to said potash ore to wash off ferrous medium and dissolve fine ore particles, and recovering said washed-off ferrous medium from the resultant brine-ferrous medium mixture.

2. The process of claim 1 wherein said sink product is washed.

3. The process of claim 1 wherein said float product is washed.

4. The process of claim 1 wherein both said sink product and said float product are washed.

5. The process of claim 1 wherein said sink product and said float product are separately removed in a time period less than 5 minutes from the time the respective ore is introduced into said separating medium.

6. The process of claim 1 wherein the specific gravity of said separating medium is within the range of from about 2.05 to about 2.50.

7. The process of claim 1 wherein the size range is substantially from about −2 inches to +65 mesh.

8. The process of claim 1 wherein the size range is substantially from about −1 inch to +65 mesh.

9. The process of claim 1 wherein the size range is substantially from about −3 mesh to +10 mesh.

10. The process of claim 1 wherein said potash ore is given a quick wash with a saturated brine to remove liberated slimes prior to the sink-float separation.

11. A process for separating langbeinite from halite in a substantially water soluble potash ore containing these minerals which comprises introducing said potash ore of a size range suitable for sink and float separation into a substantially self-sustaining separating medium comprising a ferrous medium suspended in a brine substantially saturated with respect to said potash ore, said separating medium having a specific gravity within the range of from about 2.05 to about 2.50, whereby the particles of a specific gravity lower than said separating medium float and the particles of a specific gravity higher than said separating medium sink, removing separately the sink product containing a major portion of the langbeinite values in said potash ore and the float product containing a portion of the halite values in said potash ore, separately draining the separating medium from said sink product and said float product, washing at least one of said separately removed and drained products with a brine unsaturated with respect to said potash ore to wash off ferrous medium and dissolve fine ore particles, and recovering said washed-off ferrous medium from the resultant brine-ferrous medium mixture.

12. The process of claim 11 where said drained sink product is washed.

13. The process of claim 11 wherein said drained float product is washed.

14. The process of claim 11 wherein both said drained sink product and said drained float product are washed.

15. The process of claim 11 wherein said separating medium drained from said sink product is recycled into contact with fresh potash ore.

16. The process of claim 11 wherein the size range is substantially from about −1 inch to +65 mesh.

17. The process of claim 11 wherein the size range is substantially from about −3 mesh to +10 mesh.

18. The process of claim 11 wherein said potash ore is given a quick wash with a saturated brine to remove liberated slimes prior to the sink-float separation.

19. The process of claim 11 wherein said ferrous medium is selected from the group consisting of magnetite, ferrosilicon, and mixtures thereof.

20. The process of claim 11 wherein said potash ore contains at least 10% by weight of langbeinite.

References Cited in the file of this patent

UNITED STATES PATENTS

| | | |
|---|---|---|
| 2,590,756 | Colin | Mar. 25, 1952 |
| 2,623,637 | Fontein | Dec. 30, 1952 |
| 2,932,395 | Marot | Apr. 12, 1960 |